Sept. 9, 1924.
J. GRAVES
BATTERY CELL POLISHING MACHINE
Filed Feb. 25, 1921
1,507,596
2 Sheets-Sheet 1
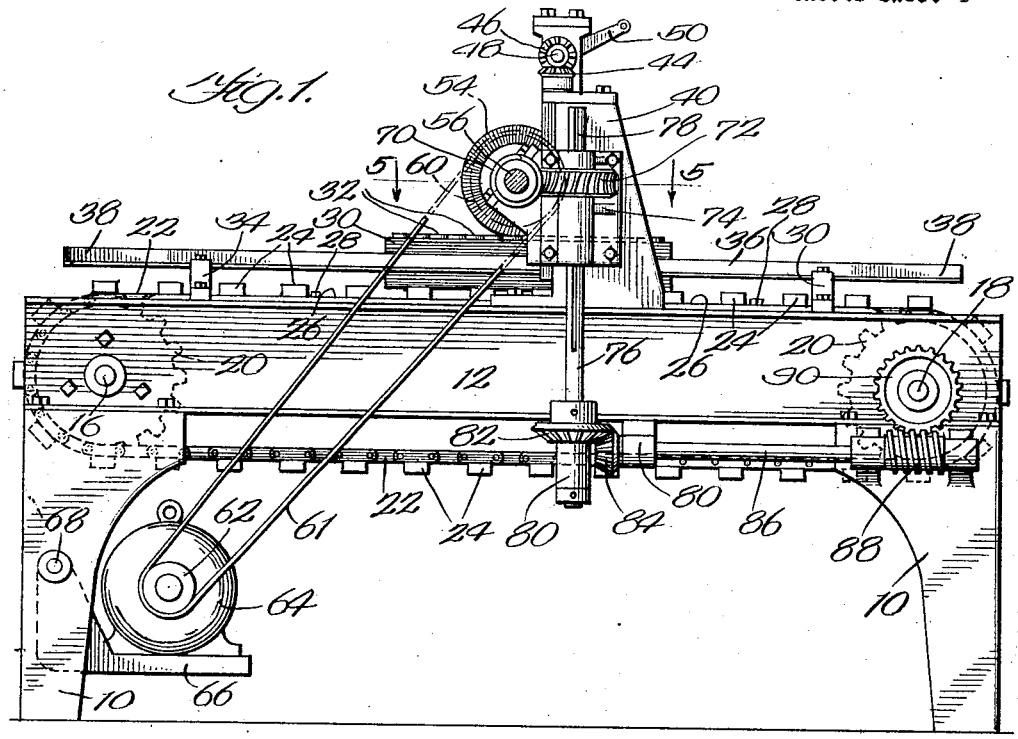
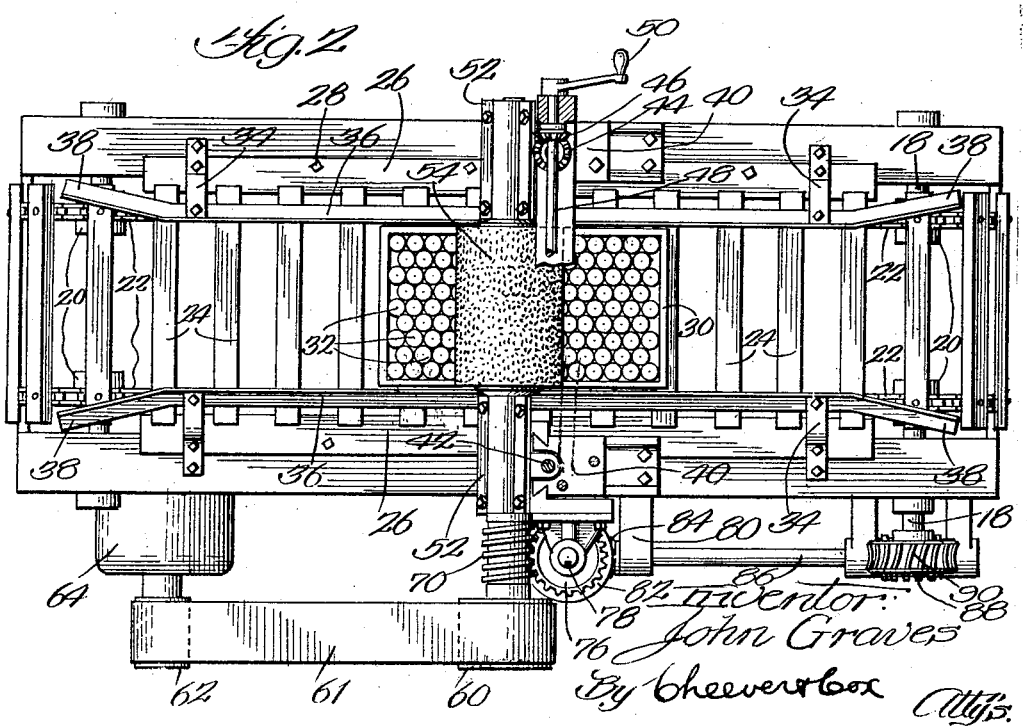

Sept. 9, 1924. 1,507,596
J. GRAVES
BATTERY CELL POLISHING MACHINE
Filed Feb. 25, 1921 2 Sheets-Sheet 2
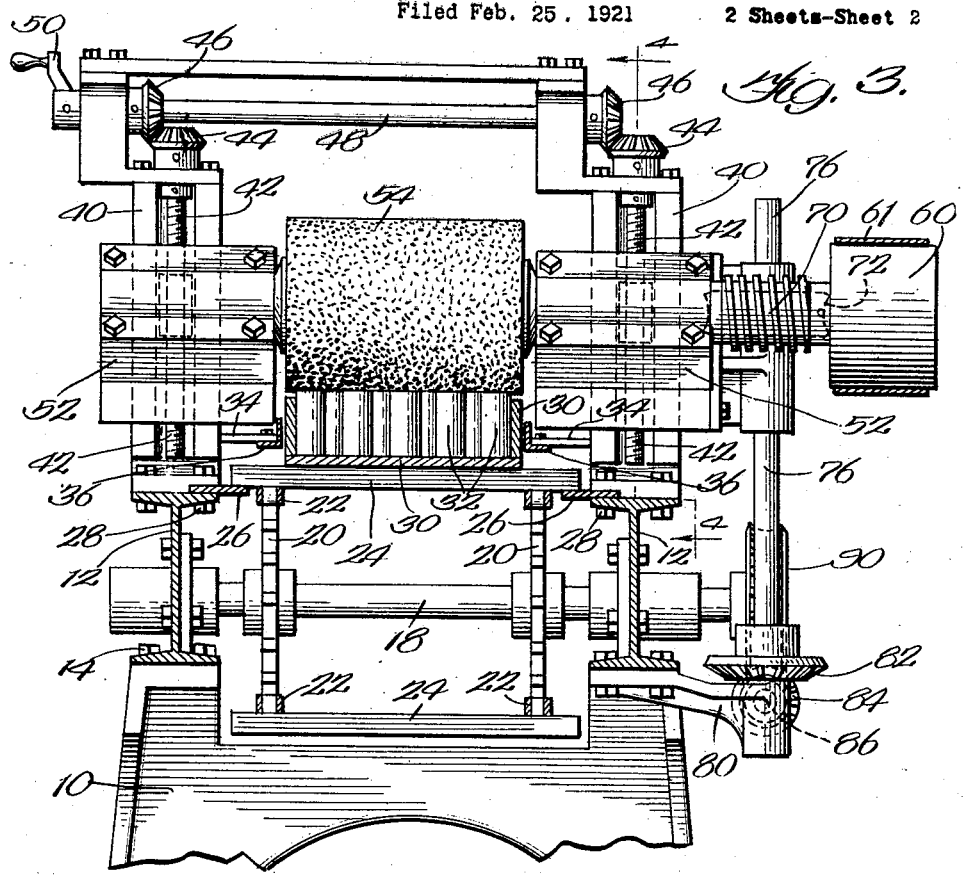
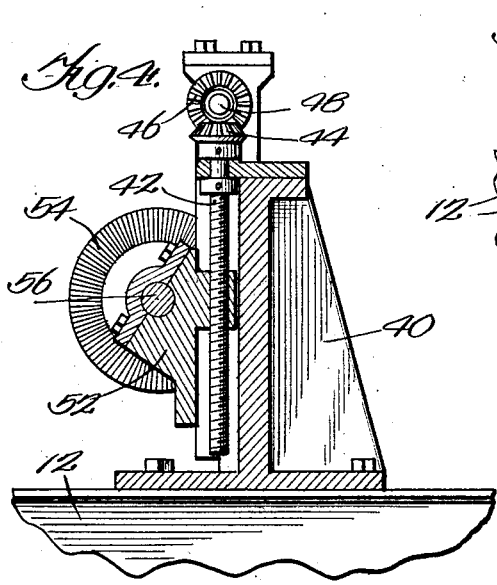
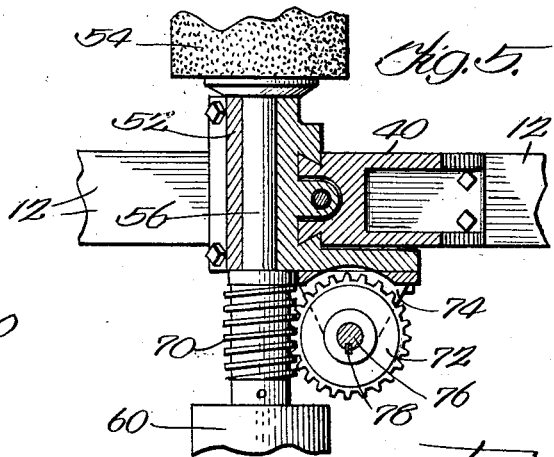
Inventor:
John Graves
By Cheever+Cox
Attys Patented Sept. 9, 1924.

1,507,596

UNITED STATES PATENT OFFICE.

JOHN GRAVES, OF MADISON, WISCONSIN, ASSIGNOR TO FRENCH BATTERY & CARBON COMPANY, OF MADISON, WISCONSIN, A CORPORATION OF WISCONSIN.

BATTERY-CELL-POLISHING MACHINE.

Application filed February 25, 1921. Serial No. 447,837.

*To all whom it may concern:*

Be it known that I, JOHN GRAVES, a citizen of the United States, residing at Madison, in the county of Dane and State of Wisconsin, have invented a certain new and useful Improvement in Battery-Cell-Polishing Machines, of which the following is a specification.

Modern commercial dry batteries used in flash lamps and the like are almost uniformly made in zinc tubes in which one portion usually the bottom of the tube, is used as one terminal of the battery, contactable by an electric connecting device to which the battery is applied. In order to afford ready electrical contact it is necessary that when the batteries are finished such contact point be at least thoroughly cleaned of all foreign material such as grease and the like, if not actually polished. Heretofore it has been the practice for the operator completing the battery to pick it up, place it against a buffing wheel or equivalent tool, polish it off, put it down, pick up another and repeat the operation. This is a very expensive operation as such batteries have to be sold at a very low price and every cent of cost entering into their construction is a serious matter.

The objects of the invention are to provide a polishing or cleaning machine in which a large number of battery cells may be passed thru it at one time to clean or polish the bottoms of the battery cells, and to provide such a machine readily adjustable to handle batteries of different sizes so that only one machine will be required in a factory making batteries of many different sizes.

The invention consists in a machine capable of attaining the foregoing and other objects which can be easily and comparatively cheaply made, which is satisfactory in operation, and not liable to get out of order. More particularly, the invention consists in many features and details of construction hereafter more fully set forth in the specification and claims.

Referring to the drawings in which like numerals denote like parts thruout the several views, Figure 1 is a side elevation of a machine illustrating this invention in its preferred form.

Figure 2 is a plan view of a machine of Figure 1.

Figure 3 is an end view of the machine taken from the left hand side of Figure 1.

Figure 4 is a detail view of certain mechanism taken on the line 4—4 of Figure 3.

Figure 5 is a detail plan view taken on the line 5—5 of Figure 1.

The machine is mounted on two end supports or pedestals 10 connected together by parallel separated I-beams 12 suitably secured in position by any suitable means as the screws 14. Journaled in opposite ends of the I-beams 12 are two shafts 16 and 18, each carrying a pair of sprocket wheels 20 over which pass sprocket chains 22. Each link of a given sprocket chain 22 carries one end of a cross bar 24 attached to a corresponding link on the opposite chain. In passing along the upper path from the top of one wheel 20 to the other the ends of these cross bars 24 travel on supporting tracks 26 suitably secured to the adjacent I-beam by any suitable means as for instance screws 28. This construction insures the cross bars 24 traveling across the top of the machine, being on a level one with the other and affording a flat traveling conveyor or floor on which a box 30 containing the battery cells 32 to be polished may be placed, with the assurance that all portions of the box and its contents will be evenly supported as it is carried along by the conveyor.

Rigidly supported from the top flanges of the I-beam 12 are angular braces 34 supporting and positioning suitable tracks, in the particular case here illustrated angle irons 36, extending parallel to the path of travel of the box 30 on the conveyor belt described, and so positioned that the box 30 is guided by these tracks so that as the conveyor belt moves the box is transported from one end of the machine to the other between the tracks. The track members 36 are so spaced that in their center portions, as shown in Figure 2, they approach quite closely to the sides of the box 30 while their ends 38 flare outward so as to afford a convenient tapered entrance for the ready insertion of the box between the tracks on the conveyor.

Rising from and rigidly secured to the upper flanges of the I-beams 12 are oppositely disposed upper frame members 40 having suitably journaled therein vertical screws 42 carrying at their upper ends bevel gears 44 meshing with interfitting bevel gears 46 carried by a common shaft 48 drivable by a hand crank 50.

Each one of these screws 42 has threaded upon it a cross head 52. These heads are spaced apart for the insertion between the two blocks of a rotatable battery cleaning or polishing device, in the particular case here illustrated, a brush 54, mounted on a shaft 56 journaled at its opposite ends in said cross heads 52. By properly rotating the crank 50 to simultaneously rotate the screws 42 in the obvious manner, the operator can raise or lower the cross heads 52 and consequently the brush 54 to cause it to either engage a given set of battery cells 30 with any desired variation of pressure or to accommodate the device to properly brush battery cells of different heights passed thru the machine, viz., a box filled with cells of greater or less height than those shown in the drawing.

It is necessary to provide power for driving the conveyor belt mechanism and also to provide power for driving the shaft 56 carrying the brush 54 and to do this under all conditions which arise from the variation in position of the height of shaft 56. The preferred method of doing this, as shown in the drawing, will now be described:—
The end of shaft 56 is equipped with a pulley 60 which is in the same plane as pulley 62 on an electric motor 64, provided with current from any suitable source of electric energy. Belt 61 passes over both pulleys. This motor 64 is mounted on a support 66 pivoted to one of the frame members 10 at 68. This pivot 68 is so positioned with reference to the length of the member 66 that the motor 64 can drop down by gravity as the shaft 56 is lowered and can be correspondingly raised by the pull exerted on belt 61 as shaft 56 is elevated. In other words the motor 64 acts as an automatic belt tightener so that power is efficiently transferred from the motor 64 to the brush 54 in all positions of the brush within its range of operation in the machine.

On shaft 56 inside the pulley 60 is a worm 70 meshing with a worm wheel 72 carried in suitable supporting brackets 74 extending from the side of the adjacent crosshead 52 with the result that this worm wheel 72 travels up and down in unison with worm 70 and its driving shaft 56. This worm wheel 72 is perforated by a vertical shaft 76 which it drives by means of a spline connection 78 in all positions of the worm wheel on the shaft. The shaft 76 is rotatably mounted at its lower end on bracket 80 carried on the frame of the machine. Above this bracket 80 is an ordinary bevel gear wheel 82 meshing with another gear wheel 84 on a suitably journaled horizontal shaft 86 whose opposite end carries a worm 88 meshing with a worm wheel 90 on shaft 18, heretofore referred to, with the result that when shaft 56 is rotated by the motor 64 in the manner described, it, thru worm wheel 72 drives shaft 76, shaft 86 and finally shaft 18 to cause the conveyor belt to travel.

Belt 61 transmitting power via the brush and thence to shaft 76 and shaft 86 to worm 88 to drive the conveyor is a single power transmitting system delivering power from the motor 64 to the conveyor. In the complete operation of the device, the operator fills a box 30 with battery cells 32 which are to be polished. He then takes hold of handle 50 and manipulates it to adjust the brush 54 to approximately the right height for polishing the particular batteries 32 in hand. He then starts the motor 64, thereby causing the brush 54 to rotate and consequently the conveyor belt to travel, and as soon as the machine is running places the box 30 of battery cells on to the conveyor with the result that it is carried under the brush 54 and the upper surfaces of the battery ends are polished and cleaned off. As long as only battery cells of this given size are to be polished, box after box can be fed thru without change in adjustment. When cells of different lengths are to be polished the operator simply re-manipulates handle 50 to raise or lower the brush as the case may be. As this is done the motor 64 adjusts itself to keep the belt right and the operation of brushing the new set of cells is proceeded with in the obvious manner.

The word "spline" used in the claims is not limited to a specific spline construction but includes any non-rotatable connection between shaft and gear which allows the gear to slide on the shaft. One very important reason for making brush 54 vertically adjustable is that the machine may be run in either direction as desired, to, without reversing the brush itself, compensate for the bend and wear which takes place in a wire brush when used in such a machine, it being well known that owing to the fact that a rotary wire brush running in one direction for any great length of time has a tendency to bend the tips of the wire all in one direction and that back in the opposite direction to which the brush is rotating, and the points of the wire bristles become worn on a slant that has a sliding rather than a scratching effect, this does not clean. To obviate this machine is made to reverse and run in the opposite direction but runs equally well in either direction. This reversing renews the brush making it better than when it is new. Due to the fact that the bristles are all hooked to the front or in the direction the brush rotates, together with the fact that the ends of the bristles or wires are chisel shape on the end and in the right direction, making it work with half the pressure on the cans, it has been found that when the machine is reversed it is necessary to raise the brush a little in order to be able to run a box through without polishing too much of the zinc away.

This is a very valuable feature when one considers the trouble it would be to have to take the brush off and reverse it and put it back on again, a proceeding which takes a lot of time.

To effect reversal it is only necessary to provide a reversible motor 64 well known in the electrical art.

Having thus described my invention what I claim as new and desire to secure by Letters Patent, is:—

1. In a device of the class described, a movable conveyor belt, means for maintaining the load carrying portions of the conveyor belt in substantial alinement, a rotatable brush adjacent to the conveyor belt, means for varying the position of the brush to and from the conveyor belt, a single source of power, and a single power transmitting system operating through the brush to the conveyor by which said source of power simultaneously drives the conveyor belt and rotates the brush in all positions of adjustment of the brush.

2. In mechanism of the class described, a conveyor belt, track members arranged on opposite sides of the conveyor belt, adapted to engage a box of battery cells to be guided, and guide the path of travel of the belt, a rotatable brush extending transversely of the conveyor belt above the belt and said track, means for varying the position of the brush to or from the conveyor belt a single source of power, a single power transmitting system operating through the brush to the conveyor for rotating said brush and for moving said conveyor belt in all positions of the brush whereby the brush polishes the surfaces of battery cells carried by the conveyor belt between the tracks under the brush.

3. In mechanism of the class described, in combination with a horizontal frame, a conveyor belt traveling horizontally in the frame, for supporting a receptacle containing battery cells, means for maintaining the portions of the belt which support said receptacle substantially level in all positions of movement of the belt, a rotatable battery polishing device mounted across the conveyor, means for raising and lowering said polishing device, an electric motor, a belt connecting said motor to said polishing device, a movable support for the electric motor so arranged that the weight of the motor automatically maintains the tension of said belt between said members regardless of variations in the vertical positions of the polishing device, means communicating power from said cleaning member shaft to drive the belt, and means rendering the last mechanism operative by the rotation of said shaft in all positions of movement of the shaft for the purposes set forth.

4. In mechanism of the class described, a horizontally disposed conveyor belt, a gearing system for driving the conveyor belt terminating in a vertically disposed shaft carrying a spline, a crosshead reciprocatable lengthwise of said shaft, a gear rotatably mounted in said crosshead engaging the spline on said shaft to drive the shaft, a second shaft also carried by said crosshead operatively connected to the gear which is splined to the first shaft, a cleaning member carried by the second shaft adapted to engage articles carried by the conveyor belt in proximity to it, means for raising and lowering the crosshead to raise and lower the attached parts longitudinally of the first shaft, and power mechanism for driving the conveyor and cleaning member with equal efficiency regardless of the position of the crosshead and attached parts.

5. In mechanism of the class described a traveling conveyor belt adapted to transport an object, a rotatable brush across the conveyor at a predetermined height therefrom, means for adjusting the brush to and from the conveyor, and one gear and shaft train operated, from one source of power simultaneously driving through the brush to the conveyor in all positions of the brush.

In witness whereof, I have hereunto subscribed my name in the presence of two witnesses.

JOHN GRAVES.

Witnesses:
W. C. BOSTAD,
BEN W. PARK.